US012617611B2

(12) United States Patent
Liu

(10) Patent No.: US 12,617,611 B2
(45) Date of Patent: May 5, 2026

(54) INVENTORY MANAGEMENT METHOD AND SYSTEM

(71) Applicant: BEIJING GEEKPLUS TECHNOLOGY CO., LTD., Beijing (CN)

(72) Inventor: Kai Liu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 761 days.

(21) Appl. No.: 17/998,265

(22) PCT Filed: May 18, 2021

(86) PCT No.: PCT/CN2021/094416
§ 371 (c)(1),
(2) Date: Nov. 9, 2022

(87) PCT Pub. No.: WO2021/238728
PCT Pub. Date: Dec. 2, 2021

(65) Prior Publication Data
US 2023/0202755 A1 Jun. 29, 2023

(30) Foreign Application Priority Data

May 29, 2020 (CN) .......................... 202010477658.7

(51) Int. Cl.
B65G 1/04 (2006.01)
B25J 9/16 (2006.01)
(Continued)

(52) U.S. Cl.
CPC .......... B65G 1/0492 (2013.01); B25J 9/1679 (2013.01); B65G 1/065 (2013.01);
(Continued)

(58) Field of Classification Search
CPC ...... B65G 1/0492; B65G 1/065; B25J 9/1679; G05B 19/41895; B66F 9/063; B66F 9/24;
(Continued)

(56) References Cited

U.S. PATENT DOCUMENTS 8,244,603 B1 8/2012 Tang et al.
9,776,324 B1* 10/2017 Johnson ............... G05D 1/0297
(Continued)

FOREIGN PATENT DOCUMENTS

CN 1478707 3/2004
CN 1884013 12/2006
(Continued)

OTHER PUBLICATIONS

WIPO, International Search Report and Written Opinion for PCT/CN2021/094416, Aug. 16, 2021.
(Continued)

*Primary Examiner* — Thomas Randazzo
(74) *Attorney, Agent, or Firm* — Hodgson Russ LLP

(57) ABSTRACT

An inventory management method includes: scheduling, according to task information, a first autonomous mobile robot and a second autonomous mobile robot to travel to a same target workstation to perform tasks; controlling the first autonomous mobile robot to take one or more inventory containers from an inventory area and transport same to a first work point in the target workstation according to an instruction; and controlling the second autonomous mobile robot to take one or more inventory containers from the inventory area and transport same to a second work point in the target workstation according to an instruction.

20 Claims, 6 Drawing Sheets

(51) Int. Cl.

| | | |
|---|---|---|
| *B65G 1/06* | (2006.01) | |
| *B65G 1/12* | (2006.01) | |
| *B65G 1/137* | (2006.01) | |
| *G05B 19/418* | (2006.01) | |
| *G06Q 10/08* | (2023.01) | |
| *G06Q 10/087* | (2023.01) | |
| *B66F 9/06* | (2006.01) | |

(52) U.S. Cl.
CPC ....... *G05B 19/41895* (2013.01); *G06Q 10/08* (2013.01); *G06Q 10/087* (2013.01); *B66F 9/063* (2013.01)

(58) Field of Classification Search
CPC .... G06Q 10/08; G06Q 10/087; G05D 1/0297; G05D 1/024; G05D 1/0214; G05D 1/0225; G05D 1/0251; G05D 1/0257; G05D 1/0261; G05D 1/0276; G05D 1/028
See application file for complete search history.

(56) References Cited

U.S. PATENT DOCUMENTS

| | | | | |
|---|---|---|---|---|
| 9,786,187 | B1 * | 10/2017 | Bar-Zeev | ......... G06Q 10/08355 |
| 11,554,917 | B2 * | 1/2023 | Stevens | .................. B25J 9/1687 |
| 11,778,956 | B2 * | 10/2023 | Lert, Jr. | ................. A01G 9/022 47/83 |
| 2017/0274531 | A1 | 9/2017 | Johnson et al. | |
| 2018/0127211 | A1 * | 5/2018 | Jarvis | ................... G05D 1/0285 |
| 2019/0176328 | A1 | 6/2019 | Kichkaylo et al. | |
| 2020/0034780 | A1 | 1/2020 | Sikka et al. | |

FOREIGN PATENT DOCUMENTS

| | | |
|---|---|---|
| CN | 202594237 | 12/2012 |
| CN | 103523438 | 1/2014 |
| CN | 203699408 | 7/2014 |
| CN | 205602593 | 9/2016 |
| CN | 108016867 | 5/2018 |
| CN | 109178749 | 1/2019 |
| CN | 109279252 | 1/2019 |
| CN | 208307638 | 1/2019 |
| CN | 109353732 | 2/2019 |
| CN | 208932211 | 6/2019 |
| CN | 209095585 | 7/2019 |
| CN | 209834685 | 12/2019 |
| CN | 110712907 | 1/2020 |
| CN | 110723448 | 1/2020 |
| CN | 110733825 | 1/2020 |
| CN | 210176027 | 3/2020 |
| CN | 110949923 | 4/2020 |
| CN | 111638716 | 9/2020 |
| JP | H02233313 | 9/1990 |
| JP | 2007275696 | 10/2007 |
| JP | 2017141102 A | 8/2017 |
| JP | 2018199562 A | 12/2018 |
| WO | 2015097736 A1 | 7/2015 |
| WO | 2019123254 | 6/2019 |
| WO | 2019154433 | 8/2019 |
| WO | 2019228474 | 12/2019 |
| WO | 2019233484 | 12/2019 |
| WO | 2020030063 | 2/2020 |

OTHER PUBLICATIONS

JPO, Office Action for JP Application No. 2022-563233, Sep. 14, 2023.

EPO, Extended European Search Report for EP Application No. 21811869.3, Apr. 17, 2024.

CNIPA, First Office Action for CN Application No. 202010477658.7, Mar. 1, 2023.

CNIPA, Second Office Action for CN Application No. 202010477658.7, May 26, 2023.

* cited by examiner

1022

1021

1023

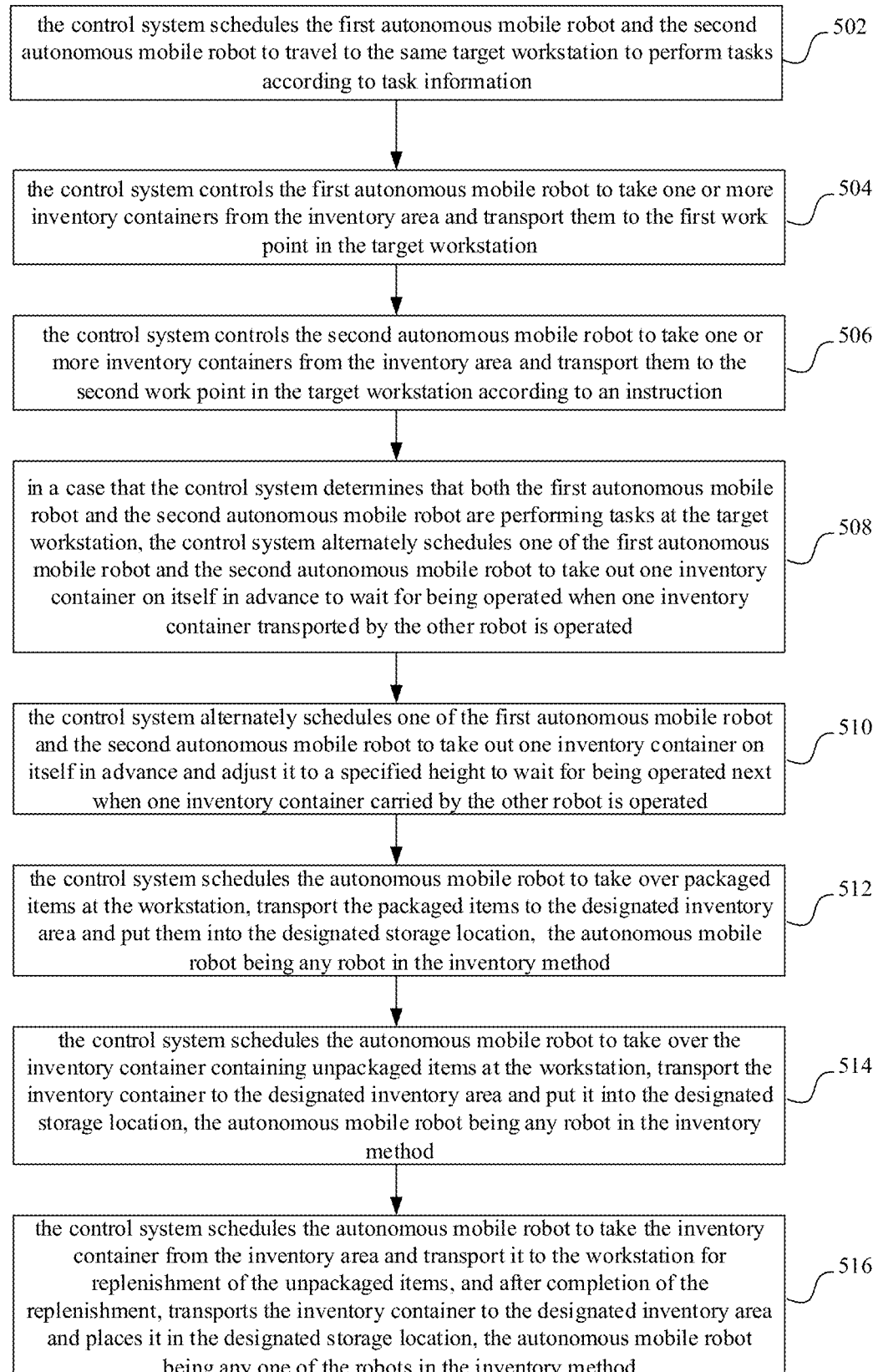

the control system schedules the first autonomous mobile robot and the second autonomous mobile robot to travel to the same target workstation to perform tasks according to task information ⌐502 the control system controls the first autonomous mobile robot to take one or more inventory containers from the inventory area and transport them to the first work point in the target workstation ⌐504 the control system controls the second autonomous mobile robot to take one or more inventory containers from the inventory area and transport them to the second work point in the target workstation according to an instruction ⌐506 in a case that the control system determines that both the first autonomous mobile robot and the second autonomous mobile robot are performing tasks at the target workstation, the control system alternately schedules one of the first autonomous mobile robot and the second autonomous mobile robot to take out one inventory container on itself in advance to wait for being operated when one inventory container transported by the other robot is operated ⌐508 the control system alternately schedules one of the first autonomous mobile robot and the second autonomous mobile robot to take out one inventory container on itself in advance and adjust it to a specified height to wait for being operated next when one inventory container carried by the other robot is operated ⌐510 the control system schedules the autonomous mobile robot to take over packaged items at the workstation, transport the packaged items to the designated inventory area and put them into the designated storage location, the autonomous mobile robot being any robot in the inventory method ⌐512 the control system schedules the autonomous mobile robot to take over the inventory container containing unpackaged items at the workstation, transport the inventory container to the designated inventory area and put it into the designated storage location, the autonomous mobile robot being any robot in the inventory method ⌐514 the control system schedules the autonomous mobile robot to take the inventory container from the inventory area and transport it to the workstation for replenishment of the unpackaged items, and after completion of the replenishment, transports the inventory container to the designated inventory area and places it in the designated storage location, the autonomous mobile robot being any one of the robots in the inventory method ⌐516

FIG. 5

INVENTORY MANAGEMENT METHOD AND SYSTEM

This application is a U.S. national phase application of International Application No. PCT/CN2021/094416, filed on May 18, 2021, which claims priority to Chinese Patent Application No. 202010477658.7, filed on May 29, 2020, the entire disclosures of which are incorporated herein by reference.

TECHNICAL FIELD

The present disclosure relates to the technical field of warehousing and logistics, and in particular, to an inventory management method and system.

BACKGROUND

With the explosive growth of e-commerce, the workload of inventory management in warehousing and logistics has also increased significantly. How to maximize the efficiency of inventory management is currently one of the main concerns of staff in this field.

In the related art, many e-commerce warehouses use multiple autonomous mobile robots to automatically transport inventory containers with stored items to a workstation, so as to facilitate workers at the workstation to perform warehousing and sorting.

However, when switching between multiple autonomous mobile robots, time is often wasted because the next autonomous mobile robot does not arrive at the workstation in time. Therefore, it is far from being able to achieve the goal of high efficiency pursued in the field of warehousing and logistics today.

SUMMARY

According to a first aspect of embodiments of the present specification, an inventory management system is provided. The inventory management system includes one or more inventory areas, multiple autonomous mobile robots, one or more workstations, and one or more control systems. One workstation includes at least two work points, and the multiple autonomous mobile robots at least include a first autonomous mobile robot and a second autonomous mobile robot. The control system is configured to schedule the first autonomous mobile robot and the second autonomous mobile robot to travel to a same target workstation to perform tasks according to task information;

The first autonomous mobile robot is configured to take one or more inventory containers from the inventory area and transport the one or more inventory containers to a first work point in the target workstation according to an instruction;

The second autonomous mobile robot is configured to take one or more inventory containers from the inventory area and transport the one or more inventory containers to a second work point in the target workstation according to an instruction.

According to a second aspect of embodiments of the present specification, an inventory management method is provided, including:

scheduling the first autonomous mobile robot and the second autonomous mobile robot to travel to a same target workstation to perform tasks according to task information;

controlling the first autonomous mobile robot to take one or more inventory containers from the inventory area and transport the one or more inventory containers to a first work point in the target workstation;

controlling the second autonomous mobile robot to take one or more inventory containers from the inventory area and transport the one or more inventory containers to a second work point in the target workstation according to an instruction.

BRIEF DESCRIPTION OF THE DRAWINGS

Other features, objects and advantages of the present disclosure will become more apparent upon reading the detailed description of non-limiting embodiments with reference to the following drawings. The drawings are for purposes of illustrating preferred implementations only and are not to be considered limiting of the disclosure. Also, the same components are denoted by the same reference numerals throughout the drawings. In the attached drawings:

FIG. 5 is a flowchart of an inventory management method provided by an embodiment of the present disclosure.

DETAILED DESCRIPTION

Figure 1:
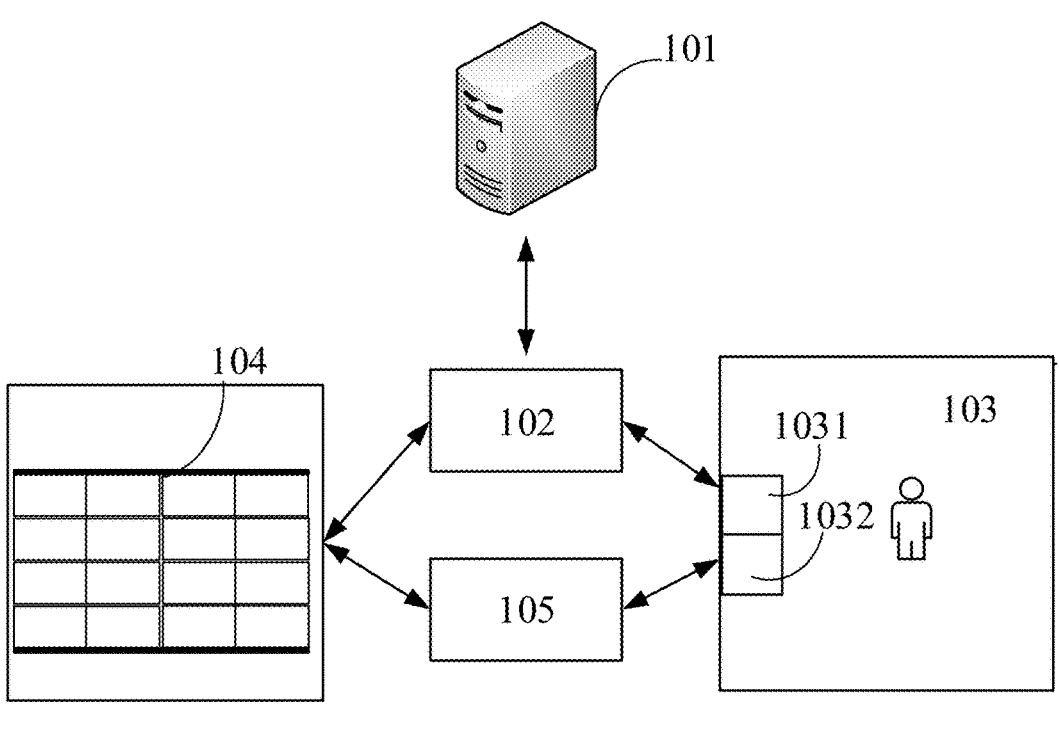
FIG. 1 is a schematic diagram of an inventory management system provided by an embodiment of the present disclosure.

In the following description, numerous specific details are set forth in order to provide a thorough understanding of the present disclosure. However, the present disclosure can be implemented in many other ways different from those described herein, and those skilled in the art can make similar promotions without departing from the connotation of the present disclosure. Therefore, the present disclosure is not limited by the specific implementation disclosed below.

The terminology used in one or more embodiments of this specification is for the purpose of describing particular embodiments only and is not intended to limit the one or more embodiments of this specification. As used in this specification and in the appended claims, the singular forms "a," "said," and "the" are intended to include the plural forms as well, unless the context clearly dictates otherwise. It will also be understood that the term "and/or" as used in this specification in one or more embodiments refers to and includes any and all possible combinations of one or more of the associated listed items.

It will be understood that although the terms first, second, etc. may be used in one or more embodiments of this specification to describe various information, such information should not be limited by these terms. These terms are only used to distinguish the same type of information from each other. For example, a first may be termed a second, and similarly, a second may be termed a first, without departing from the scope of one or more embodiments of this specification. Depending on the context, the word "if" as used herein can be interpreted as "in a case of" or "when" or "in response to determining."

First, terminology related to one or more embodiments of the present disclosure is explained.

In specific implementation, autonomous mobile robot (AMR) specifically refers to a robot that can be applied in warehousing and logistics scenarios, and can carry out cargo handling or cargo sorting, and autonomous mobile robot (AMR) is equipped with advanced software, which can construct a map on-site or pre-load facility drawings for navigation. Autonomous Mobile Robot (AMR) can use data from cameras, sensors such as built-in lidars, and laser scanners, and sophisticated software to detect surroundings and choose the most efficient path to its target. It can work fully autonomously, and if there are forklifts, pallets, people or other obstacles in front of it, it can use the best alternative route to get around safely. This ensures that material delivery waves stay on schedule, optimizing productivity.

High shelf: According to the customary definition of the storage equipment industry, shelves with a height of more than 5 meters are called high shelves, including beam pallet shelves, through shelves, push back shelves, double depth shelves, narrow aisle shelves or automated three-dimensional warehouses, which is the most common type of shelves in warehouses. The high shelf itself has good picking efficiency and can realize quick access to goods.

Picking: Picking is the process in which the distribution personnel of the warehouse and distribution center take out the goods from the storage shelves or pallets and transport them to the tally area according to the product name, specification, model and quantity required by the order.

In this disclosure, an inventory management method and system are provided, which will be described in detail in the following embodiments one by one.

FIG. 1 is a schematic diagram illustrating an inventory management system provided in an embodiment of the present disclosure. As shown in FIG. 1, the system includes a control system 101, a first autonomous mobile robot 102 and a second autonomous mobile robot 105, a workstation 103 and an inventory area 104.

In this embodiment, the autonomous mobile robot performs storage and picking of designated containers to designated positions according to scheduling of the control system 101. The box taking mechanisms of the first autonomous mobile robot 102 and the second autonomous mobile robot 105 can store one or more inventory containers into the inventory area and take out one or more inventory containers from the inventory area. Multiple goods can be placed in the inventory container, and the inventory container includes but is not limited to a workbin. After the first autonomous mobile robot 102 or the second autonomous mobile robot 105 takes out the target inventory container from the inventory area 104, the target inventory container can be transported to the workstation 103. The workstation 103 is provided with dual work points, namely a first work point 1031 and a second work point 1032, so that workers can pick, count, tally or store items in the inventory container through the dual work points. The first autonomous mobile robot transports the inventory container to the work point 1031, and the second autonomous mobile robot transports the inventory container to the work point 1032. The control system 101 is configured to store the correspondence between the position of the container and the identification (number) of the container and inventory information, and can generate inventory container handling tasks according to the documents that need to be operated, and assign them to the first autonomous mobile robot 102 and the first autonomous mobile robot 102 for performing the container handling tasks, and moreover plan paths for the first autonomous mobile robot 102 and the second autonomous mobile robot 105 to avoid collision. In the inventory management method provided by the embodiment of the present disclosure, the paths planned by the control system 101 for one or more autonomous mobile robots whose work locations are at the same work point are consistent. That is, the paths planned by the control system 101 for the autonomous mobile robots whose work locations are two different work points are completely different. The control system 101 implements communication and docking with the autonomous mobile robots, so that information such as the working status, location, and identity of each autonomous mobile robot can be acquired in real time.

Figure 2:
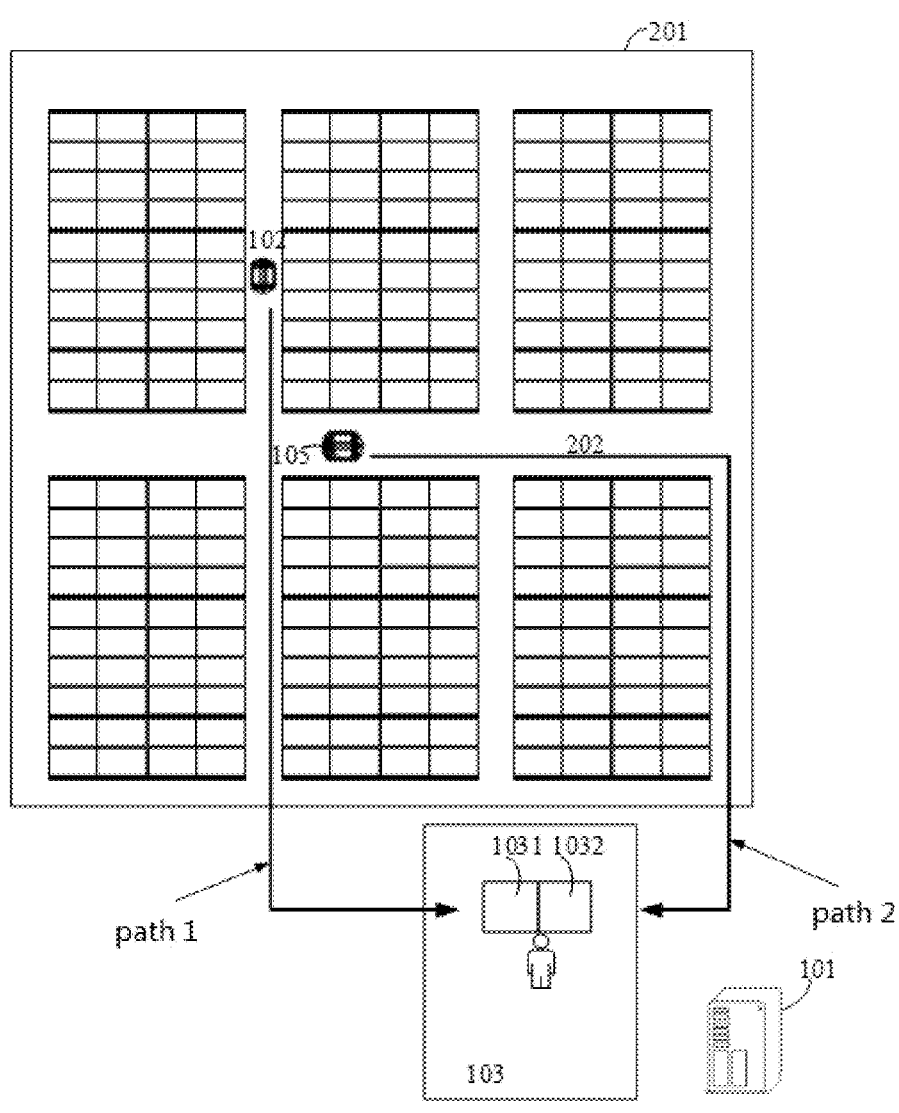
FIG. 2 is a schematic diagram of layout and handling in a storage area provided by an embodiment of the present disclosure.

FIG. 2 is a schematic diagram of layout and handling in a storage area provided by an embodiment of the present disclosure. As shown in FIG. 2, it includes a storage area 201, a first autonomous mobile robot 102 and a second autonomous mobile robot 105, a control system 101 and a workstation 103, a plurality of the storage shelves are arranged in the storage area 201, and a robot channel 202 for the first autonomous mobile robot 102 and the second autonomous mobile robot 105 to move is arranged between the adjacent storage shelves, the first autonomous mobile robot 102 and the second autonomous mobile robot 105 can, under the control of the control system 101, complete logical operations of storing and taking out the containers, as well as transport operations to and from the storage area 201 and the workstation 103.

It should be noted that, the first autonomous mobile robot 102 reaches the first working point 1031 through the path 1, and the second autonomous mobile robot 105 reaches the second working point 1032 through the path 5. The path corresponding to the first autonomous mobile robot and the path corresponding to the second autonomous mobile robot are completely inconsistent.

Figure 3:
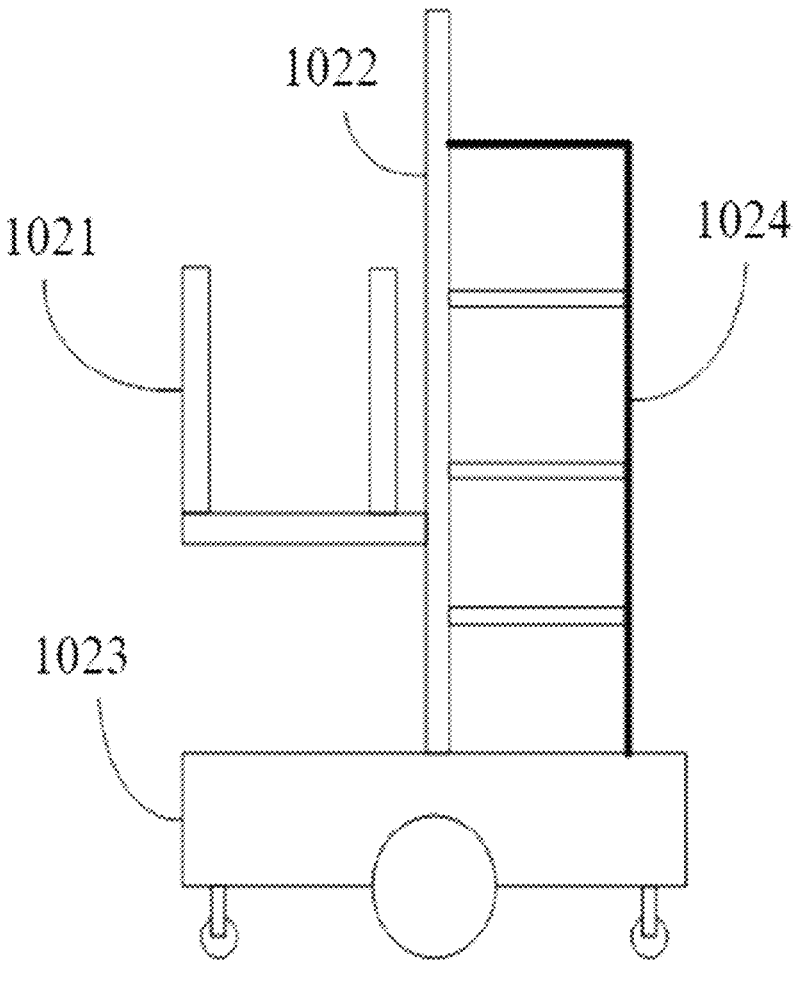
FIG. 3 is a schematic diagram of an overall structure of a robot provided by an embodiment of the present disclosure.

The autonomous mobile robot provided by the embodiment of the present disclosure may be as shown in FIG. 3. The autonomous mobile robot may be an autonomous mobile robot with a cache mechanism, and the autonomous mobile robot includes:

a container retrieval mechanism 1021, configured to obtain one or more target containers by hugging;

a lifting mechanism 1022, configured to realize up and down adjustment of the container retrieval mechanism 1021, thereby realizing retrieval of target containers on the storage shelves with different heights by the container retrieval mechanism 1021;

a robot motion chassis 1023, configured to realize driving of the autonomous mobile robot on the robot channel according to a running route planned by the control system; and a buffer mechanism 1024, configured to temporarily store at least one container and arrange the containers in sequence.

Figure 4:
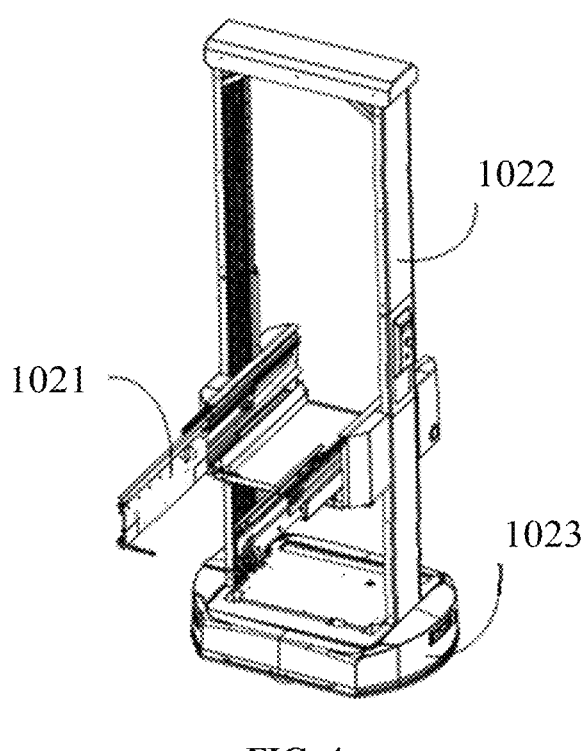
FIG. 4 is a schematic diagram of an overall structure of a robot provided by another embodiment of the present disclosure.

The autonomous mobile robot provided by the embodiment of the present disclosure may be as shown in FIG. 4, and the autonomous mobile robot may be an autonomous mobile robot without the buffer mechanism. The autonomous mobile robot includes:

the container retrieval mechanism 1021, configured to retrieve one or more target containers;

the lifting mechanism 1022, configured to realize up and down adjustment of the container retrieval mechanism 1021, thereby realizing retrieval of the target containers on the storage shelves of different heights by the container retrieval mechanism 1021; and the robot motion chassis 1023, configured to realize driving of the robot on the robot channel according to the running route planned by the control system.

In this embodiment, the control system 101 may execute steps in the method shown in FIG. 5. FIG. 5 is a schematic flowchart illustrating an inventory management method according to an embodiment of the present disclosure. The method is applied to the control system, including steps 502 to 516.

In step 502, the control system schedules the first autonomous mobile robot and the second autonomous mobile robot to travel to the same target workstation to perform tasks according to task information.

In an embodiment of the present application, in order to ensure in a case that multiple autonomous mobile robots transport inventory containers to the workstations so that workers can pick items in the inventory containers, when switching between different robots, it is possible to shorten the time required for workers to wait as much as possible, improve worker productivity, and thus maximize the efficiency of inventory management work, dual work points can be set up in each workstation used to carry out picking operations. For any one of the dual work points, the paths planned by the control system for one or more autonomous mobile robots corresponding to the work point are consistent. Similarly, for two different autonomous mobile robots corresponding to two work points respectively, the paths planned by the control system for these two different autonomous mobile robots are completely different. For example, the dual work points included in any of the workstations are a first work point and a second work point, the paths of one or more autonomous mobile robots dispatched by the control system to the first work point are consistent, and the paths of one or more autonomous mobile robots dispatched by the control system to the second work point are consistent. The path of the one or more autonomous mobile robots dispatched to the first work point is completely different from the path of the one or more autonomous mobile robots dispatched to the second work point. Since the first work point and the second work point are two adjacent work points at the target workstation, the worker continues to complete the picking operation of the inventory container carried by the autonomous mobile robot at the second work point after completing the picking operation of the inventory container carried by the autonomous mobile robot at the first work point. The waiting time of workers when switching between different robots is shortened, and the work efficiency of workers in picking operations in inventory management is greatly improved.

In this embodiment, the first autonomous mobile robot is used to represent the robot to be dispatched to the first work point. The second autonomous mobile robot is used to represent the robot dispatched to the second work point. The target workstation is the work place where the worker performs the picking operation.

In a possible implementation, the possible implementation process of step 502 is: when the first autonomous mobile robot performs a task at the first work point of the target workstation, the control system determines whether the second work point is in an idle state; when it is determined that the second work point is in an idle state, the control system schedules the second autonomous mobile robot to travel to the second work point of the target workstation to perform a task.

For example, the target workstation includes two adjacent work points, namely work point 1 and work point 2. When robot A is performing a task at work point 1 of the target workstation, the control system determines whether work point 2 is in an idle state. When the control system determines that the work point 2 is in an idle state, the control system schedules the robot B to travel to the work point 2 to perform a task.

In step 504, the control system controls the first autonomous mobile robot to take one or more inventory containers from the inventory area and transport them to the first work point in the target workstation.

It should be noted that, before controlling the first autonomous mobile robot to travel to the first working point, the control system needs to first determine whether the first autonomous mobile robot is in an idle state. If the first autonomous mobile robot is currently in an idle state, the control system performs an operation of scheduling the first autonomous mobile robot to travel to the working point.

In a possible implementation, a possible implementation process of step 504 is as follows: the control system schedules the first autonomous mobile robot to travel to the first work point to wait for being operated when determining that the first autonomous mobile robot is in an idle state.

In step 506, the control system controls the second autonomous mobile robot to take one or more inventory containers from the inventory area and transport them to the second work point in the target workstation according to an instruction.

It should be noted that, before controlling the second autonomous mobile robot to travel to the second working point, the control system needs to first determine whether the second autonomous mobile robot is in an idle state. If the second autonomous mobile robot is currently in an idle state, the control system performs an operation of scheduling the second autonomous mobile robot to travel to the working point.

In a possible implementation, a possible implementation process of step 504 is: when the control system determines that the second working point is in an idle state, the control system schedules the second autonomous mobile robot to travel to the second working point and wait for being operated.

In addition, if the control system determines that the second autonomous mobile robot has not reached the second working point within a predetermined time limit, the control system reschedules the second autonomous mobile robot to travel to a waiting position at the second working point to wait for being operated; or sends a task cancellation instruction to the second autonomous mobile robot and schedules another autonomous mobile robot to travel to the second working point to wait for being operated.

In addition, through the above steps 504 to 506, after the control system controls the first autonomous mobile robot to transport the inventory container carried by itself to the target workstation, the worker performs picking operations on the items in the inventory container carried by the first autonomous mobile robot.

In addition, in order to improve the utilization rate of the autonomous mobile robot, when the control system determines that the inventory container carried by the autonomous mobile robot is empty, the control system issues a prompt message for taking out the empty container. The autonomous mobile robot is any robot in the inventory system.

It is worth noting that when the control system issues the prompt message for taking out the empty container, the worker takes out the empty container from the autonomous mobile robot. This can avoid the problem of low utilization of the autonomous mobile robot caused by the robot returning the empty container to the inventory area after picking is completed.

In step 508, in a case that the control system determines that both the first autonomous mobile robot and the second autonomous mobile robot are performing tasks at the target workstation, the control system alternately schedules one of the first autonomous mobile robot and the second autonomous mobile robot to take out one inventory container on itself in advance to wait for being operated when one inventory container transported by the other robot is operated.

In an embodiment of the present disclosure, in order to further improve the work efficiency of inventory management, in addition to scheduling the first autonomous robot and the second autonomous robot to carry out the handling of the inventory containers at the same time based on the above steps 502 to 506 to improve the work efficiency of the inventory management work, in the inventory management method provided by the embodiment of the present disclosure, the control system can alternately schedule one of the first autonomous mobile robot and the second autonomous mobile robot to take out one inventory container on itself in advance to wait for being operated, when one inventory container transported by the other is operated. That is, for any autonomous mobile robot, when it is detected that the inventory container carried by the autonomous mobile robot is operated, the control system schedules the next autonomous mobile robot after the autonomous mobile robot and adjacent to the autonomous mobile robot in sequence, so that the next autonomous mobile robot takes out one inventory container on itself in advance and waits for being operated next, in order to reduce the time waste caused by the long waiting time of workers when switching between the autonomous mobile robots is performed, and thus improve the work efficiency of inventory management.

In a possible implementation, a possible implementation process of step 508 is: when the inventory container carried by the first autonomous mobile robot is operated, the first autonomous mobile robot sends an operation message to the control system, and the operation message carries order information of the first autonomous mobile robot. After receiving the operation message, the control system determines the second autonomous mobile robot that is located after the first autonomous mobile robot and adjacent to the first autonomous mobile robot according to the order information of the first autonomous mobile robot, and controls the second autonomous mobile robot to take out one inventory container on itself early to wait for being operated next.

In step 510, the control system alternately schedules one of the first autonomous mobile robot and the second autonomous mobile robot to take out one inventory container on itself in advance and adjust it to a specified height to wait for being operated next when one inventory container carried by the other robot is operated.

In an embodiment of the present disclosure, in order to facilitate the picking operations of workers, in addition to controlling the next autonomous mobile robot to take out one inventory container on itself in advance based on step 508, it is also possible to adjust the container retrieval mechanism based on step 510 to match the height of the current worker, so as to prevent the worker from using a climbing ladder to pick goods or bending over to pick goods when picking through the container retrieval mechanism of the autonomous mobile robot.

In a possible implementation, the possible implementation process of step 510 is: the control system determines a height value currently suitable for the worker to pick goods, and sends the height value to all one or more autonomous mobile robots dispatched to the target workstation, and the one or more autonomous mobile robots adjust the heights of the container retrieval mechanisms carried by themselves according to the height value, so that the adjusted height value of the container retrieval mechanism matches the height value of the picking operation actually performed by the worker.

In this embodiment, the adjusted height of the container retrieval mechanism matches the height value of the actual picking operation by the worker, which may mean that the adjusted height of the container retrieval mechanism is consistent with the height of the worker's actual picking operation, and may also mean that a height difference between the adjusted height of the container retrieval mechanism and the height at which the worker actually performs the picking operation is less than a reference difference, which may be adjusted according to the actual situation, which is not specifically limited here.

For example, the control system determines that the height value currently suitable for the worker to pick goods is 70 cm, and sends the height value of 70 cm to one autonomous mobile robot that is carrying inventory containers and is about to arrive at the target workstation, assuming that the autonomous mobile robot is Robot A. After receiving the height value, the robot A adjusts the height of the container retrieval mechanism carried by itself, so that the adjusted height value of the container retrieval mechanism matches the height suitable for the worker to carry out the picking operation.

In addition, when the robot has the capacity of buffering the container, that is, the buffer mechanism, the robot can take the goods out of the buffer shelf at the workstation, and adjust the container retrieval mechanism to the specified height value, so as to facilitate the workers to carry out the picking operation. After the picking is completed, the empty container can be placed in the buffer shelf, and the next container can be taken out to wait for the worker to carry out the picking operation. It should be noted that, after the robot takes out each container, it needs to adjust the container retrieval mechanism to the specified height value.

In addition, in the above process, a possible implementation process for the control system to adjust the autonomous mobile robot to the specified height is: the control system determines the target height at least partially based on the workstation where the autonomous mobile robot is located, and schedules the autonomous mobile robot to take out one inventory container on itself and adjust to the target height for waiting to be operated. The autonomous mobile robot is any robot in the inventory system.

For example, the control system determines the target height at least partially based on the workstation where robot A is located (the target height is the height of the workstation), and schedules robot A to take out one inventory container on itself and adjust to the target height for waiting to be operated.

It is worth noting that the above target height can be individually set according to the heights of different workstations. The target height may be exactly the same as the height of the workstation, or a difference between the target height and the height of the workstation may be less than a reference difference, which is not specifically limited here.

Based on the above steps 502 to 510, the technical means involved in the worker picking operation in the inventory management work are optimized, so that the efficiency is improved to a certain extent. The technical means of the container warehousing operation involved in the inventory management work can also be further optimized based on the following steps 512 to 516, so as to achieve the purpose of improving work efficiency from various perspectives in the inventory management work.

In step 512, the control system schedules the autonomous mobile robot to take over packaged items at the workstation, transport the packaged items to the designated inventory area and put them into the designated storage location. The autonomous mobile robot is any robot in the inventory method.

In a possible implementation, when the inventory management system is not configured with a buffer roller line, the possible implementation process for the control system to schedule the autonomous mobile robot to take over the packaged items at the workstation is: the control system controls the autonomous mobile robot to travel to the target workstation according to a container handling task allocated by the control system, and take over the target packaged items put by the worker through a pickup mechanism. That is, the autonomous mobile robot is scheduled to take over the packaged items in the way of manual warehousing. This manual warehousing method can reduce the cost because there is no need to configure the buffer roller line.

In another possible implementation, when the inventory management system is configured with the buffer roller line, the possible implementation process for the control system to schedule the autonomous mobile robot to take over the packaged items at the workstation is: the control system schedules the autonomous mobile robot to travel to a first end of the buffer roller line and take over the packaged items at the first end of the buffer roller line. That is, the autonomous mobile robot is dispatched to take over the packaged items in the way of automatic warehousing. This automatic warehousing method can speed up the transmission efficiency of items and reduce the waste of time between the robots transporting items by themselves.

In this embodiment, the packaged items are loaded onto the buffer roller line at a second end of the buffer roller line and transported to the first end of the buffer roller line.

In addition, in a possible implementation, a possible implementation process for the control system to control the autonomous mobile robot to move the packaged items to a designated inventory area and put them into a designated storage location is: the control system can determine the designated storage location of the target packaged items in the inventory area according to a prestored correspondence relationship between the storage location of the container and the identifier of the container itself, and control the autonomous mobile robot to transport the packaged items to the designated inventory area and put it into the designated storage location.

In addition, if the autonomous mobile robot has the capacity of buffering the container, that is, the buffer mechanism, for the whole container of goods, the worker at the workstation can directly place the whole container of goods in the container retrieval mechanism of the autonomous mobile robot, or in the storage shelf connected to the main body of the robot, and the robot then carries the whole container of goods to the inventory area, and puts the whole container of goods into the designated storage location through picking-and-placing the container.

In step 514, the control system schedules the autonomous mobile robot to take over the inventory container containing unpackaged items at the workstation, transport the inventory container to the designated inventory area and put it into the designated storage location. The autonomous mobile robot is any robot in the inventory method.

In a possible implementation, when the inventory management system is not configured with a buffer roller line, the possible implementation process for the control system to schedule the autonomous mobile robot to take over the inventory container containing the unpackaged items at the workstation is as follows: the control system controls the autonomous mobile robot to travel to the target workstation according to the container handling task assigned by the control system, and take over the inventory container containing the unpackaged items through the pickup mechanism. That is, in the way of manual warehousing, the autonomous mobile robot is scheduled to take over the inventory container containing the unpackaged items. This manual warehousing method can reduce the cost because there is no need to configure the buffer roller line.

In another possible implementation, when the inventory management system is configured with a buffer roller line, the possible implementation process for the control system to schedule the autonomous mobile robot to take over the inventory container containing the unpackaged items at the workstation is: the control system schedules the autonomous mobile robot to travel to the first end of the buffer track line, and take over the inventory container containing the unpackaged items at the first end of the buffer roller line.

In this embodiment, the inventory container containing the unpackaged items is loaded onto the buffer roller line at the second end of the buffer roller line and transferred to the first end of the buffer roller line.

In addition, in a possible implementation, the possible implementation process for the control system to schedule the autonomous mobile robot to transport the inventory container to a designated inventory area and put it into a designated storage location is: the control system can determine the designated storage location of the inventory container containing the unpackaged items in the inventory area according to a prestored correspondence relationship between the storage location of the container and the identifier of the container itself, and control the autonomous mobile robot to transport the inventory container containing the unpackaged items to the designated inventory area and put it in the designated storage area.

In step 516, the control system schedules the autonomous mobile robot to take the inventory container from the inventory area and transport it to the workstation for replenishment of the unpackaged items, and after completion of the replenishment, transports the inventory container to the designated inventory area and places it in the designated storage location. The autonomous mobile robot is any one of the robots in the inventory method.

In a possible implementation, the possible implementation process of step 516 is: the autonomous mobile robot takes the inventory container from the inventory area, and travels to the target workstation according to the replenishment task assigned by the control system to replenish the unpackaged items. After the replenishment is completed, the control system can determine the designated storage location of the inventory container after replenishment according to the prestored correspondence relationship between the storage location of the container and the identifier of the container itself, and then transport the inventory container after replenishment to the designated inventory area and place it in designated storage location.

It should be noted that the inventory container taken by the autonomous mobile robot from the inventory area in the above process may be an empty container, or a container containing some unpackaged items but not full, which is not specifically limited here.

In this embodiment, when the inventory container taken by the autonomous mobile robot from the inventory area is a container that accommodates some unpackaged items but is not full, there are two cases. In the first case, the unpackaged items in the container to be replenished are of the same type as the items used for replenishment at the workstation, and the unpackaged items in the container to be replenished are the same as the items to be put on the shelf. In this case, the replenishment operation of unpackaged items is also a regular inventory replenishment operation. In the second case, the unpackaged items in the container to be replenished and the items used for replenishment in the workstation are different types of items. In this case, the control system can be configured to allow different types of unpackaged items to be mixed.

In addition, one or a few of the above-mentioned autonomous mobile robots may be installed with an RFID (radio frequency identification) reading and writing device. After the autonomous mobile robot takes out the inventory container from the inventory area, it can directly read the RFID of the commodity in the inventory container through the RFID reading and writing device, thereby identifying the memory of the commodity.

In an embodiment of the present disclosure, the first autonomous mobile robot and the second autonomous mobile robot are scheduled to travel to the same target workstation to perform the task according to the task information; the first autonomous mobile robot is controlled to take one or more inventory containers from the inventory area and transport them to the first work point in the target workstation; the second autonomous mobile robot is controlled to take one or more inventory containers from the inventory area according to the instruction and transport them to the second work point in the target workstation. Since the first work point and the second work point are two adjacent work points in the same workstation, after the worker has finished picking goods from the inventory container carried by the first autonomous mobile robot, he can continue to pick goods from the inventory container carried by the second autonomous mobile robot, which can avoid the time waste caused by the robot switching in the traditional method of picking goods at only one work point in one workstation, and improve the work efficiency of inventory management.

Figure 6:
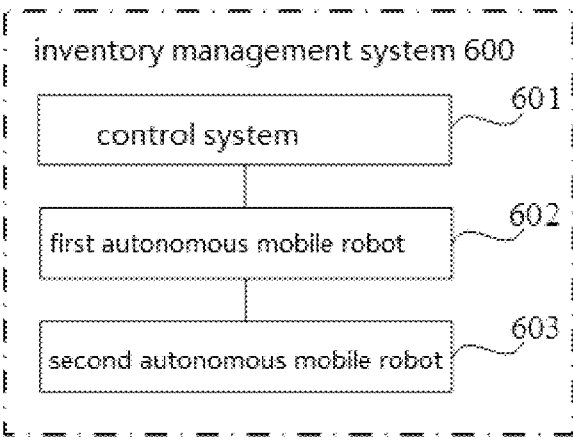
FIG. 6 is a schematic diagram of an inventory management system provided by an embodiment of the present disclosure.

Corresponding to the foregoing method embodiments, the present specification also provides an embodiment of an inventory management system, and FIG. 6 shows a schematic structural diagram of an inventory management system 600 according to an embodiment of the present specification. As shown in FIG. 6, the system includes:

a control system 601, wherein the control system is configured to schedule a first autonomous mobile robot and a second autonomous mobile robot to travel to the same target workstation to perform tasks according to task information;

a first autonomous mobile robot 602, wherein the first autonomous mobile robot is configured to take one or more inventory containers from the inventory area and transport them to a first work point in the target workstation according to an instruction; and a second autonomous mobile robot 603, wherein the second autonomous mobile robot is configured to take one or more inventory containers from the inventory area and transport them to a second work point in the target workstation according to an instruction.

Optionally, the control system is further configured to:

in the case that it is determined that the first autonomous mobile robot and the second autonomous mobile robot are performing tasks at the same target workstation, alternately schedule one of the first autonomous mobile robot and the second autonomous mobile robot to take out one inventory container on itself in advance to wait for being operated next when one inventory container transported by the other robot is operated.

Optionally, the control system is further configured to:

alternately schedule one of the first autonomous mobile robot and the second autonomous mobile robot to take out one inventory container on itself in advance and adjust it to a specified height to wait for being operated next when one inventory container carried by the other robot is operated.

Optionally, the control system is further configured to:

determine a target height at least in part based on the workstation where the autonomous mobile robot is located, and schedule the autonomous mobile robot to take out one inventory container on itself and adjust it to the target height to wait for being operated, the autonomous mobile robot being any robot in the inventory system.

Optionally, the control system is further configured to:

in a case that it is determined that the inventory container carried by the autonomous mobile robot is empty, issue a prompt message for taking out the empty container, the autonomous mobile robot being any robot in the inventory system.

Optionally, the control system is further configured to:

schedule the autonomous mobile robot to take over packaged items at the workstation, transport the packaged items to a designated inventory area and put them into a designated storage location, where the autonomous mobile robot is any robot in the inventory system.

Optionally, the control system is further configured to:

schedule the autonomous mobile robot to take over the inventory container containing unpackaged items at the workstation, transport the inventory container to the designated inventory area and put it into the designated storage location, the autonomous mobile robot being any robot in the inventory system.

Optionally, the control system is further configured to:

schedule the autonomous mobile robot to take the inventory container from the inventory area and transport it to the workstation for replenishment of the unpackaged items, and after the replenishment is completed, transport the inventory container to the designated inventory area and place it in the designated storage location, the autonomous mobile robot being any robot in the inventory system.

Optionally, the control system is further configured to:

schedule the autonomous mobile robot to travel to a first end of a buffer roller line, and take over the packaged items at the first end of the buffer roller line, wherein the packaged items are loaded to the buffer roller line at a second end of the buffer roller line and transferred to the first end of the buffer roller line.

Optionally, the control system is further configured to:

schedule the autonomous mobile robot to travel to the first end of the buffer roller line, and take over the inventory container containing the unpackaged items at the first end of the buffer roller line, wherein the inventory container containing the unpackaged items is loaded onto the buffer roller line at the second end of the buffer roller line and transferred to the first end of the buffer roller line.

In this embodiment of the present disclosure, the first autonomous mobile robot and the second autonomous mobile robot are scheduled to travel to the same target workstation to perform tasks according to task information; the first autonomous mobile robot is controlled to take one or more inventory containers from the inventory area and transport them to the first work point in the target workstation; the second autonomous mobile robot is controlled to take one or more inventory containers from the inventory area according to the instruction and transport them to the second work point in the target workstation. Since the first work point and the second work point are two adjacent work points in the same workstation, after the worker has finished picking goods from the inventory container carried by the first autonomous mobile robot, he can continue to pick goods from the inventory container carried by the second autonomous mobile robot, which can avoid the time waste caused by the robot switching in the traditional method of picking goods at only one work point in one workstation, and improve the work efficiency of inventory management.

It should be noted that, for the convenience of description, the foregoing method embodiments are all expressed as a series of action combinations, but those skilled in the art should know that the present application is not limited by the described action sequence, this is because in accordance with the present application, certain steps may be performed in other orders or simultaneously. Secondly, those skilled in the art should also know that the embodiments described in the specification are all preferred embodiments, and the actions and modules involved are not necessarily all necessary for the present application.

In the above-mentioned embodiments, the description of each embodiment has its own emphasis. For parts that are not described in detail in a certain embodiment, reference may be made to related descriptions of other embodiments.

The preferred embodiments of the present application disclosed above are only provided to help illustrate the present application. Alternative embodiments are not intended to exhaust all details, nor do they limit the invention to only the described embodiments. Obviously, many modifications and variations are possible in light of the content of this specification. These embodiments are selected and described in this specification in order to better explain the principles and practical applications of the present application, so that those skilled in the art can well understand and utilize the present application. This application is to be limited only by the claims, along with their full scope and equivalents.

What is claimed is:

1. An inventory management system, comprising one or more inventory areas, multiple autonomous mobile robots, one or more workstations, and one or more control systems, each of the one or more workstations comprising at least two work points, and the multiple autonomous mobile robots at least comprising a first autonomous mobile robot and a second autonomous mobile robot, wherein:

each of the one or more control systems is configured to schedule the first autonomous mobile robot and the second autonomous mobile robot to travel to a target workstation to perform tasks according to task information;

the first autonomous mobile robot is configured to take one or more first inventory containers from the one or more inventory areas and transport the one or more first inventory containers to a first work point in the target workstation according to an instruction; and the second autonomous mobile robot is configured to take one or more second inventory containers from the one or more inventory areas and transport the one or more second inventory containers to a second work point in the target workstation according to an instruction;

wherein the first work point and the second work point are two adjacent work points in the target workstation.

2. The inventory management system of claim 1, wherein each of the one or more control systems is further configured to, determine a target height based at least in part on a workstation where any one of the multiple autonomous mobile robots is located, and schedule the any one of the multiple autonomous mobile robots to take out a target inventory container transported thereby and adjust the target inventory container to the target height to wait for subsequent operation.

3. The inventory management system of claim 1, wherein each of the one or more control systems is further configured to, in a case that it is determined that there is an empty inventory container transported by any one of the multiple autonomous mobile robots, issue a prompt message for taking out the empty inventory container.

4. The inventory management system of claim 1, wherein each of the one or more control systems is further configured to schedule any one of the multiple autonomous mobile robots to take a target inventory container containing unpackaged items from the one or more inventory areas and transport the target inventory container to the one or more workstations for replenishment of the unpackaged items, and after the replenishment is completed, transport the target inventory container to a designated inventory area and place the target inventory container in a designated storage location.

5. The inventory management system of claim 1, wherein each of the one or more control systems is further configured to, in a case that it is determined that the first autonomous mobile robot and the second autonomous mobile robot are performing tasks in the target workstation, alternately schedule one of the first autonomous mobile robot or the second autonomous mobile robot to take out in advance an inventory container transported thereby to wait for subsequent operation when an operation on an inventory container transported by another robot of the first autonomous mobile robot or the second autonomous mobile robot is performed.

6. The inventory management system of claim 5, wherein each of the one or more control systems is further configured to alternately schedule one of the first autonomous mobile robot or the second autonomous mobile robot to take out in advance the inventory container transported thereby and adjust the inventory container to a specified height to wait for subsequent operation when the operation on the inventory container transported by another robot of the first autonomous mobile robot or the second autonomous mobile robot is performed.

7. The inventory management system of claim 1, wherein each of the one or more control systems is further configured to schedule any one of the multiple autonomous mobile robots to take over packaged items at the one or more workstations, transport the packaged items to a designated inventory area and place the packaged items into a designated storage location.

8. The inventory management system of claim 1, wherein each of the one or more control systems is further configured to schedule any one of the multiple autonomous mobile robots to travel to a first end of a buffer roller line, and take over the packaged items at the first end of the buffer roller line, wherein the packaged items are loaded onto the buffer roller line at a second end of the buffer roller line and transferred to the first end of the buffer roller line.

9. The inventory management system of claim 1, wherein each of the one or more control systems is further configured to schedule any one of the multiple autonomous mobile robots to take over a target inventory container containing unpackaged items at the one or more workstations, transport the target inventory container to a designated inventory area and place the inventory container into a designated storage location.

10. The inventory management system of claim 1, wherein each of the one or more control systems is further configured to schedule any one of the multiple autonomous mobile robots to travel to a first end of a buffer roller line, and take over a target inventory container containing the unpackaged items at the first end of the buffer roller line, wherein the target inventory container containing the unpackaged items is loaded onto the buffer roller line at a second end of the buffer roller line and transferred to the first end of the buffer roller line.

11. An inventory management method, applied in a control system of an inventory management system, the inventory management system comprising one or more inventory areas, a plurality of autonomous mobile robots and one or more workstations, and the plurality of autonomous mobile robots at least comprising a first autonomous mobile robot and a second autonomous mobile robot, the method comprising:

scheduling the first autonomous mobile robot and the second autonomous mobile robot to travel to a target workstation to perform tasks according to task information;

controlling the first autonomous mobile robot to take one or more first inventory containers from the one or more inventory areas and transport the one or more inventory first containers to a first work point in the target workstation according to an instruction; and controlling the second autonomous mobile robot to take one or more second inventory containers from the one or more inventory areas and transport the one or more second inventory containers to a second work point in the target workstation according to an instruction;

wherein the first work point and the second work point are two adjacent work points in the target workstation.

12. The method of claim 11, further comprising: determining a target height based at least in part on a workstation where any one of the autonomous mobile robots is located, and scheduling the any one of the autonomous mobile robots to take out a target inventory container transported thereby and adjust the target inventory container to the target height to wait for subsequent operation.

13. The method of claim 11, further comprising: in a case that it is determined that there is an empty inventory container transported by any one of the autonomous mobile robots, issuing a prompt message for taking out the empty inventory container.

14. The method of claim 11, further comprising scheduling any one of the autonomous mobile robots to take a target inventory container containing unpackaged items from the one or more inventory areas and transport the target inventory container to the one or more workstations for replenishment of the unpackaged items, and after the replenishment is completed, transport the target inventory container to a designated inventory area and place the target inventory container in a designated storage location.

15. The method of claim 11, further comprising: in a case that it is determined that the first autonomous mobile robot and the second autonomous mobile robot are performing tasks at the target workstation, alternately scheduling one of the first autonomous mobile robot or the second autonomous mobile robot to take out in advance an inventory container transported thereby to wait for subsequent operation when an operation on an inventory container transported by another robot of the first autonomous mobile robot or the second autonomous mobile robot is performed.

16. The method of claim 15, further comprising alternately scheduling one of the first autonomous mobile robot or the second autonomous mobile robot to take out in advance the inventory container transported thereby and adjust the inventory container to a specified height to wait for subsequent operation when the operation on the inventory container transported by another robot of the first autonomous mobile robot or the second autonomous mobile robot is performed.

17. The method of claim 11, further comprising scheduling any one of the autonomous mobile robots to take over packaged items at the one or more workstations, transport the packaged items to a designated inventory area and place the packaged items into a designated storage location.

18. The method of claim 17, further comprising scheduling any one of the autonomous mobile robots to travel to a first end of a buffer roller line, and take over the packaged items at the first end of the buffer roller line, wherein the packaged items are loaded onto the buffer roller line at a second end of the buffer roller line and transferred to the first end of the buffer roller line.

19. The method of claim 11, further comprising scheduling any one of the autonomous mobile robots to take over a target inventory container containing unpackaged items at the one or more workstations, transport the target inventory container to a designated inventory area and place the target inventory container into a designated storage location.

20. The method of claim 19, further comprising scheduling any one of the autonomous mobile robots to travel to a first end of a buffer roller line, and take over a target inventory container containing the unpackaged items at the first end of the buffer roller line, wherein the target inventory container containing the unpackaged items is loaded onto the buffer roller line at a second end of the buffer roller line and transferred to the first end of the buffer roller line.

* * * * *